United States Patent
Yin et al.

(10) Patent No.: US 12,548,317 B2
(45) Date of Patent: Feb. 10, 2026

(54) STRUCTURED PRUNING OF VISION TRANSFORMER

(71) Applicant: Samsung Electronics Co., Ltd., Suwon-si (KR)

(72) Inventors: Miao Yin, Plainsboro, NJ (US); Burak Uzkent, Sunnyvale, CA (US); Yilin Shen, San Jose, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 17/900,126

(22) Filed: Aug. 31, 2022

(65) Prior Publication Data

US 2023/0073835 A1 Mar. 9, 2023

Related U.S. Application Data

(60) Provisional application No. 63/241,988, filed on Sep. 8, 2021.

(51) Int. Cl.
*G06V 10/70* (2022.01)
*G06V 10/74* (2022.01)
(Continued)

(52) U.S. Cl.
CPC ............ *G06V 10/87* (2022.01); *G06V 10/761* (2022.01); *G06V 10/774* (2022.01); *G06V 10/776* (2022.01)

(58) Field of Classification Search
CPC .... G06V 10/87; G06V 10/761; G06V 10/774; G06V 10/776; G06V 10/82
(Continued)

(56) References Cited

U.S. PATENT DOCUMENTS

| 2022/0374766 A1* | 11/2022 | Thorsley | ................ G06N 3/045 |
| 2023/0080247 A1* | 3/2023 | Yin | ........................ G06V 10/94 382/155 |

(Continued)

FOREIGN PATENT DOCUMENTS

| CN | 113516030 A | | 10/2021 |
| CN | 113947680 A | | 1/2022 |
| CN | 114037074 A | * | 2/2022 |

OTHER PUBLICATIONS

DynamicViT: Efficient Vision Transformers with Dynamic Token Sparsification, by Rao, Yongming, Zhao, Wenliang, Liu, Benlin, Lu, Jiwen, Zhou, Jie, Hsieh, Cho-Jui, ARXIV.org and NeurIPS 2021. Project page: https://dynamicvit.ivg-research.xyz/ Jun. 3, 2021 (Year: 2021).*

(Continued)

*Primary Examiner* — Jennifer Mehmood
*Assistant Examiner* — Heath E. Wells

(57) ABSTRACT

In one embodiment, a method includes accessing a batch B of a plurality of images, wherein each image in the batch is part of a training set of images used to train a vision transformer comprising a plurality of attention heads. The method further includes determining, for each attention head A, a similarity between (1) the output of the attention head evaluated using each image in the batch and the (2) output of each attention head evaluated using each image in the batch. The method further includes determining, based on the determined similarities, an importance score for each attention head; and pruning, based on the importance scores, one or more attention heads from the vision transformer.

20 Claims, 4 Drawing Sheets

(51) Int. Cl.
*G06V 10/774* (2022.01)
*G06V 10/776* (2022.01)

(58) Field of Classification Search
USPC .......................................................... 382/155
See application file for complete search history.

(56) References Cited

U.S. PATENT DOCUMENTS

| | | | | |
|---|---|---|---|---|
| 2023/0084203 A1* | 3/2023 | Li | .................. | G06N 3/0499 706/25 |
| 2023/0124177 A1* | 4/2023 | Jayakumar | ............. | G06N 3/082 706/15 |

OTHER PUBLICATIONS

Vision Transformer Pruning by M. Zhu et al., accessed on Oct. 20, 2022 at https://arxiv.org/pdf/2104.08500.pdf with a publication date of Aug. 14, 2021 (Year: 2021).*

Chasing sparsity in vision transformers: An end-to-end exploration by T. Chen et al., 35th Conference on Neural Information Processing Systems (NeurIPS 2021), accessed on Oct. 20, 2022 at https://www.researchgate.net/profile/Zhangyang-Wang/publication/352244002_Chasing_Sparsity_in_Vision_TransformersAn_End-to-End_Exploration/links/60c3e8a0299bf1949f4e68b5/Chasing-Sparsity-in-Vision-TransformersAn-End-to-End-Exploration.pdf, Jun. 9, 2021.
Unified Visual Transformer Compression by S. Yu et al., ICLR 2022 conference paper, accessed on Oct. 20, 2022 at https://arxiv.org/pdf/2203.08243.pdf, Mar. 15, 2022.
Vision Transformer Pruning by M. Zhu et al., accessed on Oct. 20, 2022 at https://arxiv.org/pdf/2104.08500.pdf, Aug. 14, 2021.
HFSP: A Hardware-Friendly Soft Pruning Framework for Vision Transformers by Zhenglun Kong et al., ICLR 2022 Conference Withdrawn Submission, Oct. 2021.
SPViT: Enabling Faster Vision Transformers via Soft Token Pruning by Zhenglun Kong et al., accessed on Aug. 31, 2022 at https://www.researchgate.net/publication/357417913_SPViT_Enabling_Faster_Vision_Transformers_via_Soft_Token_Pruning, Dec. 2021.
Vision Transformer Slimming: Multi-Dimension Searching in Continuous Optimization Space by Arnav Chavan et al., accessed on Aug. 31, 2022 at https://arxiv.org/abs/2201.00814, Jan. 2022.

* cited by examiner

Algorithm 1: Attention Head Ranking

Input: Sampled batch $\{X_b\}_{b=1}^{B}$, attention heads $\{A_h\}_{h=1}^{H}$;
Output: Importance score $s = [s_1, \cdots, s_H]$.

1: Initialize transition matrix: $P := \text{zeros}(H, H)$;
2: for $i = 1$ to $H$ do
3:    for $j = 1$ to $H$ do
4:       Calculate $P(i,j)$ via Eq. 3;
5:    end for
6: end for
7: Normalize each column of $P$;
8: Initialize $s := \text{ones}(H)/H$;
9: repeat
10:    $s' := s$;
11:    $s := Ps$;
12:    $\delta := \|s - s'\|$;
13: until $\delta \leq \epsilon$

Algorithm 2: Overall GOHSP Procedure

Input: Dense weight $\{W_{\text{attn}}, W_{\text{mlp}}\}$, desired model size $\{\kappa_{\text{attn}}, \kappa_{\text{mlp}}\}$, training data $\mathcal{D}$, number of epochs $E$;
Output: Structured sparse weight $\{\tilde{W}_{\text{attn}}, \tilde{W}_{\text{mlp}}\}$;

1: Sample a batch of data $\{X_b\}_{b=1}^{B}$ from $\mathcal{D}$;
2: Calculate importance score $s$ via Alg. 1;
3: Obtain structured mask $M_{\text{attn}}$ according to $s$;
4: // Initialize auxiliary variable
5: $Z_{\text{attn}} := W_{\text{attn}}, Z_{\text{mlp}} := W_{\text{mlp}}$;
6: // Initialize Lagrangian multiplier
7: $U_{\text{attn}} := 0, U_{\text{mlp}} := 0$;
8: for $e = 1$ to $E$ do
9:    Update $W_{\text{attn}}, \hat{W}_{\text{attn}}$ via Eq. 10 and Eq. 11;
10:   Update $Z_{\text{attn}}, Z_{\text{mlp}}$ via Eq. 12 and Eq. 13;
11:   Update $U_{\text{attn}}, U_{\text{mlp}}$ via Eq. 14 and Eq. 15;
12: end for
13: Fine-tune pruned weight $\{\tilde{W}_{\text{attn}}, \tilde{W}_{\text{mlp}}\}$.

Fig. 2

STRUCTURED PRUNING OF VISION TRANSFORMER

PRIORITY CLAIM

This application claims the benefit under 35 U.S.C. 119 of U.S. Provisional Patent Application No. 63/241,988 filed Sep. 8, 2021, the entirety of which is incorporated herein by reference.

TECHNICAL FIELD

This application generally relates to structured pruning of vision transformers.

BACKGROUND

Vision transformers are transformers that can be used on computer-vision tasks such as image recognition, object detection, and semantic segmentation. Vision transformers use many parameters to define the model, and may use more parameters than other models such as convolutional neural networks. For example, a vision transformer model can have more than 500 million parameters, and these parameters may be determined during model training and used during model deployment to perform vision-related tasks.

BRIEF DESCRIPTION OF THE DRAWINGS

FIG. 2 illustrates example algorithms for pruning a vision transformer.

DESCRIPTION OF EXAMPLE EMBODIMENTS

Vision transformers can be used for many computer-vision tasks such as image classification, object detection, super-resolution, video classification, and semantic segmentation. A vision transformer may take an input image and divide the image into regions, or patches. Each patch may be associated with a position value identifying its position in the image. Linear projections of flattened patches may be input, along with the position values, to a transformer encoder, along with, for example an extra learnable class embedding if the vision task relates to classification. The transformer encoder may include several attention head layers and multilayer perceptron (MLP) layers. For example, embedded image patches may be vectorized, normalized, and fed into a multi-head attention layer, and the output of the multi-head attention layer may be normalized and fed to an MLP layer. In particular embodiments, a transformer encoder for a vision transformer may have twelve such layers (e.g., twelve attention-head layers and twelve MLP layers). When performing classification, the vision transformer may return a class value or a set of weighted class values corresponding to classification probabilities based on the content of the input image.

Vision transformers can include many parameters, and each attention-head layer and each MLP layer introduces many parameters to the model. For example, a vision transformer can have many parameters that define the model, such as 6 million, 22 million, 50 million, or greater than 500 million parameters that define the output of the model. These parameters can drastically increase model size and computational resources required to use the model relative to other, but less accurate, models used for computer-vision tasks. The size of the model and the required computational resources necessary to execute the model can render vision transformers unsuitable for deployment on relatively lightweight computing devices, such as for example on smartphones, on other electronic portable devices, or on Internet-of-things (IoT) devices.

Figure 1:
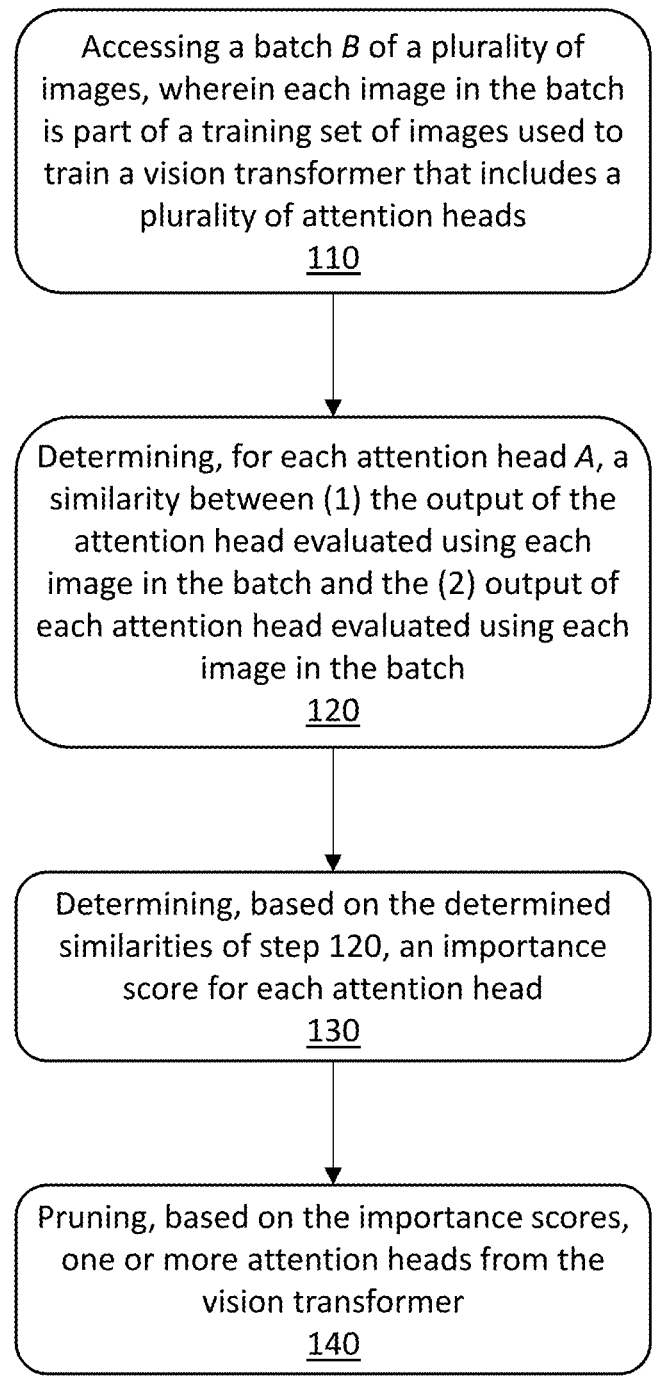
FIG. 1 illustrates an example method of structured pruning of a vision transformer.

FIG. 1 illustrates an example method of structured pruning of a vision transformer. This pruning introduces sparsity to the model by reducing the number of model parameters while still retaining model accuracy. The reduction in parameters can be defined by the needs of the device, or user of the device, executing the model; for example, a reduction in model parameters can be specified to be reduced by a certain percentage (e.g., a 40% reduction in model parameters) or can be specified by a set ceiling on the number of parameters (e.g., no more than 50 million parameters). The resulting pruned model drastically reduces the model size and complexity in a configurable manner (i.e., how much to prune the model can be specified) while retaining model performance, e.g., by identifying and pruning the parameters that are relatively unimportant to model performance.

The following notation is used in this disclosure: for an L-block (or L-layer) vision transformer, $W_{attn}^{(l)} = \{W_{qkv}^{(l)}, W_{proj}^{(l)}\}$ and $W_{mlp}^{(l)} = \{W_{fc1}^{(l)}, W_{fc2}^{(l)}\}$ represent the weights of the attention layer and the MLP layer at the l-th block, respectively. For each attention layer, there are H self-attention heads, namely $W_{qkv}^{(l)} = \{W_{qkv}^{(l,h)}\}_{h=1}^{H}$ and $W_{proj}^{(l)} = \{W_{proj}^{(l,h)}\}_{h=1}^{H}$. To simplify the notation, this disclosure often refers to one block, or layer, as an example of the operations described herein and omits the superscript (layer index).

The method of FIG. 1 uses structured pruning, a type of hardware-friendly compression. Unlike structured pruning of other models, such as convolutional neural networks (CNNs), structured sparse vision-transformer models can exhibit multi-granularity sparsity (i.e., head-level and column-level) in the different component modules (i.e., attention head and MLP).

The meaning of 'structured sparsity' varies with different model types due to the different architectures used by different models. For example, structured pruning of CNNs and recurrent neural networks (RNNs) typically indicates the removal of the entire channels of the weight tensors and the entire columns of the weight matrices, respectively. However, for either of these two cases, only one type of the structured sparse pattern exists because of the architectural homogeneity of the CNN and RNN.

In contrast, a vision transformer model exhibits inherent architectural heterogeneity. Within the same block, or layer, in a given vision transformer, the front-end multi-head attention module and the back-end MLP module represent two types of design philosophy for information processing, thereby leading to large differences on both computing procedures and the available structured sparse patterns.

For example, for structured pruning of a vision transformer, three types of structured sparse patterns can co-exist with different levels of granularity across different modules. For the multi-head attention module, because each attention head is processing the information individually in a parallel way, pruning can be performed at the head-level to sparsify this component. In addition, the weights in the heads are represented in a matrix format, and therefore column-level sparsity in the attention-head layer can also be introduced in structured pruning of a vision transformer. Meanwhile, because the MLP consists of multiple weight matrices as well, the column-level sparsity can also be imposed on the MLP module. Consequently, a structured pruning of a vision transformer can exhibit heterogeneous structured sparsity.

In particular embodiments, structured pruning of a vision transformer with loss function $\ell$ can be formulated as the following general optimization problem:

$$\min_{W_{attn}, W_{mlp}} \ell(W_{attn}, W_{mlp}), \quad (1)$$

$$\text{s.t.} \quad \|W_{attn}\|_0^h \leq \kappa_{attn}^h,$$

$$\|W_{attn}\|_0^c \leq \kappa_{attn}^c,$$

$$\|W_{mlp}\|_0^c \leq \kappa_{mlp}^c,$$

where $\kappa^c$ and $\kappa^h$ are the desired number of columns (attention and MLP columns, as shown in equation 1) and the desired number of heads after pruning, respectively. $\|\cdot\|_0^c$ and $\|\cdot\|_0^h$ are the column-based and head-based group L0-norm, which denote the number of non-zero columns and the number of non-zero heads, respectively.

From the perspective of information processing, multi-head attention shares some similarities with convolutional layer processing. However, using existing channel pruning for CNNs or other model types to perform head-level pruning in a vision transformer leads to inferior pruning results in the vision transformer. For instance, the receptive fields and the focused locality of the attention head in vision transformers and the filters in CNNs are different, and hence simply using the criterion for pruning channels is not a suitable strategy for pruning vision transformers. Second, most of the existing channel pruning criterion are built on the information of each individual channel (the corresponding filter weight and/or its feature map). When adopting this philosophy in the head pruning, the insufficient utilization of inter-head information can cause performance loss. Therefore, the unique characteristics of multi-head attention architecture calls for attention-specific pruning criterion in order to improve the pruning performance and model performance of the vision transformer.

As discussed above, in particular embodiments three types of structured sparse patterns (head-level, column-level within the heads, and column-level for the MLPs) can co-exist in the different modules of a structured pruned vision transformer. Embodiments of the pruning strategy disclosed herein utilize a coordination scheme that can impose these different structured sparse patterns in a joint and global way, even given the complicated interaction among different types of structured sparsity in the vision transformer model.

Embodiments of this disclosure use a graph-based approach to measure and determine the importance of different attention heads, which can be further used for follow-up pruning. Embodiments of this disclosure model the inter-head correlation as a graph, and then leverage the graph-based ranking to select important attention heads. For example, a graph G=(A,E) may be constructed to represent the attention heads and their similarities in the block of a vision transformer, for example as illustrated in the simplified example of flow 320 of FIG. 3. The set of nodes A denote all the attention heads $\{A_h\}_{h=1}^H$, and E is the set of connected edges. For edge $E(A_i, A_j)$, its weight is defined as the expected cosine similarity between $A_i$ and $A_j$. The graph defined with such cosine similarity can be interpreted as a Markov chain, where each node is a state, and the transition probability P(i,j) between two states is the edge weight. P(i,j) can be calculated as $$P(i,j) = \mathbb{E}_{x \sim D}[\text{CosineSim}(A_i(X), A_j(X))], \quad (2)$$

where $A_i(X)$ is the output of the i-th attention head with sampled input X and D is the data set. Thus, the entire transition matrix P of a Markov chain may be obtained. Each column of P should be further normalized, for example as illustrated in step 7 of the example Algorithm 1 of FIG. 2.

Calculating the transition probability can be computationally very costly since it needs to be performed across the entire training dataset D. Particular embodiments therefore adopt a batch-based estimation strategy to improve computation efficiency without sacrificing ranking performance. For example, as described in Eq. 3, only a subset or batch of training data, which are the images used to initially train the vision transformer, is sampled and used to estimate the transition probability. In particular embodiments, using different batch sizes B bring stable ranking results for the attention heads.

$$P(i, j) = \text{Cosine Sim}\left(\sum_{b=1}^B A_i(X_b), \sum_{b=1}^B A_j(X_b)\right). \quad (3)$$

Mathematically, an irreducible and aperiodic Markov chain is guaranteed to converge to a stationary distribution. Once converged, the probability that a random walker stays in one state can reflect the state importance. Embodiments of this disclosure quantify the importance of each attention head by calculating the stationary distribution in our constructed Markov chain. In particular embodiments, the iterative power method can be used by setting a uniform distribution for the states as the initialization.

FIG. 1 illustrates an example method of structured pruning of a vision transformer. As shown in FIG. 1, step 110 includes accessing a batch B of a plurality of images, wherein each image in the batch is part of a training set of images used to train a vision transformer that includes a plurality of attention heads. At step 120, the example method of FIG. 1 includes determining, for each attention head A, a similarity between (1) the output of the attention head evaluated using each image in the batch and the (2) output of each attention head evaluated using each image in the batch. For example, as discussed above, a cosine similarity may be used to calculate the similarity (include self-similarity) between the output of attention heads for each image in a batch B of images. For example, in particular embodiments step 120 includes determining a similarity matrix P, where each entry i,j in the similarity matrix P is equal to $\text{CosineSim}(\Sigma_{b=1}^B A_i(X_b), \Sigma_{b=1}^B A_j(X_b))$, and $X_b$ is a vector representation of image b from the batch of images B.

FIG. 2 illustrates example algorithms for pruning a vision transformer. Algorithm 1 of FIG. 2 illustrates an example algorithm for determining a vector s of importance scores, each score corresponding to a particular attention head in the vision transformer. With reference to Algorithm 1 of FIG. 2, steps 1-7 of Algorithm 1 illustrate an example procedure for calculating a similarity matrix P for determining a similarity between attention heads (including self similarity) given a batch B of images.

Step 130 of the example method of FIG. 1 includes determining, based on the determined similarities of step 120, an importance score for each attention head. In particular embodiments, each importance score corresponds to an entry in a vector s, where s=Ps and s is initialized with a set of initial values. As illustrated in the example Algorithm 1 of FIG. 2, s may be an H-dimensional vector (where H is the number of attention heads in the vision transformer) with each entry initialized to a value of 1/H. In particular embodiments, determining the importance score for each attention head includes iteratively determining s=Ps until a difference between iterations is less than a predetermined threshold amount, for example less than a predetermined threshold amount ε, as shown in example Algorithm 1 of FIG. 1.

Step 140 of the example method of FIG. 1 includes pruning, based on the importance scores, one or more attention heads from the vision transformer. For example, once the importance score for each state is obtained via calculating the stationary distribution, the corresponding attention heads can be ranked. Particular embodiments use a binary mask matrix $M_{attn} = \{M_{qkv}, M_{proj}\}$ to indicate the weight entries associated with the least important attention heads. In particular embodiments, at this stage head pruning can be performed using the mask matrix (or, in particular embodiments, pruning may occur immediately after the final scores s are determined). For example, given the provided goals for model reduction (e.g., the desired percentage decrease in model parameters), heads with small rankings can be pruned from the model, and then fine tuning may be performed as described below. In addition, columns of MLPs with the least group Li norm may also be pruned. In contrast, in particular embodiments at this stage head pruning is not performed yet. Instead, in particular embodiments the binary mask $M_{attn}$ is used for the "soft" pruning, optimization-based structured pruning stage described below, and it may be integrated into Eq. 1 as follows:

$$\min_{W_{attn}, W_{mlp}} \ell(W_{attn}, W_{mlp}) \quad (4)$$

$$\text{s.t.} \quad \|(1 - M_{attn}) \odot W_{attn}\|_0 = 0,$$

$$\|W_{mlp}\|_0 \le \kappa_{mlp}^c,$$

$$\|M_{attn} \odot W_{attn}\|_0^c \le \kappa_{attn}^c,$$

where $\odot$ is element-wise product. In general, because the optimization stage coordinates and adjusts the different types of structured sparse patterns from a global perspective, utilizing this ranking-only "soft" pruning strategy instead of directly pruning the least important heads can provide more flexibility and better results for the optimization-stage procedure to better identify how sparsity should be imposed (e.g., which heads, head columns, and MLP columns to remove from the vision transformer).

As discussed above, the co-existence of multigranularity and multi-location of the sparsity of vision transformer models make the structured pruning procedure for vision transformers very challenging. Particular embodiments address this by utilizing optimization techniques to perform systematic structured pruning. As explained above, these embodiments do not prune the heads or columns immediately (e.g., based on the binary mask), since any direct hard pruning at the early stage may increase accuracy loss. Instead, particular embodiments adopt a "soft-pruning" strategy by optimizing the vision transformer towards the desired structured sparse formats. In other words, the three types of sparsity pattern are gradually imposed onto the attention heads and MLPs. To that end, equation 5 relaxes the constraints of Eq. 4 and rewrites it as follows:

$$\min_{W_{attn}, W_{mlp}} \ell(W_{attn}, W_{mlp}) + \frac{\lambda}{2}\|(1 - M_{attn}) \odot W_{attn}\|_F^2, \quad (5)$$

$$\text{s.t.} \quad \|W_{mlp}\|_0^c \le \kappa_{mlp}^c,$$

$$\|M_{attn} \odot W_{attn}\|_0^c \le \kappa_{attn}^c,$$

where λ is the coefficient that controls the influence of the quadratic term. Note here that the constraints that the objective is subject to (κ) are set by, or informed by, the desired reduction in model parameters discussed more fully herein. When constraints of continuous non-convex problems are sparsity related, ADMM techniques can be a suitable optimization solution. Thus, equations 6 and 7 introduce the auxiliary variables $Z_{attn}$, $Z_{mlp}$ and indicator functions as:

$$g(Z_{attn}) = \begin{cases} 0 & \|M_{attn} \odot Z_{attn}\|_0^c \le \kappa_{attn}^c, \\ +\infty & \text{otherwise,} \end{cases} \quad (6)$$

$$h(Z_{mlp}) = \begin{cases} 0 & \|Z_{mlp}\|_0^c \le \kappa_{mlp}^c, \\ +\infty & \text{otherwise.} \end{cases} \quad (7)$$

Then, equation 5 can be re-written in the following equivalent form:

$$\min_{W, Z} \ell(W_{attn}, W_{mlp}) + g(Z_{attn}) + h(Z_{mlp}) + \frac{\lambda}{2}\|(1 - M_{attn}) \odot W_{attn}\|_F^2, \quad (8)$$

$$\text{s.t.} \quad W_{mlp} = Z_{mlp},$$

$$W_{attn} = Z_{attn}.$$

In these scenarios, the corresponding augmented Lagrangian function of the above optimization objective is:

$$\mathcal{L}_\rho(W_{attn}, W_{mlp}, Z_{mlp}) = \ell(W_{attn}, W_{mlp}) + g(Z_{attn}) + \quad (9)$$

$$h(Z_{mlp}) + \frac{\lambda}{2}\|(1 - M_{attn}) \odot W_{attn}\|_F^2 + \frac{\rho}{2}\|W_{attn} - Z_{attn} + U_{attn}\|_F^2 +$$

$$\frac{\rho}{2}\|U_{attn}\|_F^2 + \frac{\rho}{2}\|W_{mlp} - Z_{mlp} + U_{mlp}\|_F^2 + \frac{\rho}{2}\|U_{mlp}\|_F^2,$$

Where ρ>0 is the penalty parameters, and $U_{attn}$, $U_{mlp}$ are the Lagrangian multipliers. In particular embodiments, ρ can be considered as a parameter that controls the trade-off between the speed of imposing sparsity and task performance. For example, a larger ρ makes the model exhibit more sparsity at the earlier stage, thereby needing fewer epochs to updated variables over. However, too larger a value of ρ can degrade accuracy. In particular embodiments, ρ may be 0.001 Then the variable at step t can be iteratively updated as:

$$W_{attn}^t = W_{attn}^{t-1} - \eta \frac{\ell(W_{attn}, W_{mlp}^{t-1})}{W_{attn}} - \quad (10)$$

$$\lambda\left[(1 - M_{attn}) \odot W_{attn}^{t-1}\right] - \rho(W_{attn}^{t-1} - Z_{attn}^{t-1} + U_{attn}^{t-1}),$$

$$W_{mlp}^t = W_{mlp}^{t-1} - \eta \frac{\ell(W_{attn}^t, W_{mlp})}{W_{mlp}} - \rho(W_{mlp}^{t-1} - Z_{mlp}^{t-1} + U_{mlp}^{t-1}), \quad (11)$$

$$Z_{attn}^t = \mathcal{P}(W_{attn}^t + U_{attn}^{t-1}), \quad (12)$$

-continued $$Z_{mlp}^t = \mathcal{P}(W_{mlp}^t + U_{mlp}^{t-1}), \quad (13)$$

$$U_{attn}^t = U_{attn}^{t-1} + W_{attn}^t - Z_{attn}^t, \quad (14)$$

$$U_{mlp}^t = U_{mlp}^{t-1} + W_{mlp}^t - Z_{mlp}^t. \quad (15)$$

Here, η is the learning rate of the optimizer for training the vision transformer and $\mathcal{P}$ is the Euclidian projection for the sparse constraint.

After the optimization procedure described above, the structured sparsity has been gradually imposed onto the vision transformer. In other words, the weight values of the masked attention heads, as well as some columns of MLPs and of attention heads, have become relatively extremely small. Then, those small weights can be pruned, i.e., by removing (weighting as 0) the corresponding attention heads, MLP columns, and attention-head columns from the vision transformer's analysis and performance when the vision transformer is used on subsequent vision-related tasks. After pruning, particular embodiments may then perform one or more rounds of fine-tuning by re-training, one or more times, the pruned model using the same dataset that the vision transformer was originally trained on before pruning, but with the new weights resulting from the pruning procedure (i.e., with the weights corresponding to pruned heads and columns zeroed out).

Algorithm 2 of FIG. 2 illustrates an example algorithm for structured pruning of a vision transformer. As shown in Algorithm 2, which is also referred to herein as a graph and optimization-based structured pruning (GOHSP) procedure, given the importance scores s calculated, e.g., from Algorithm 1, dense weights for attention heads and MLP layers can be converted to sparse weights for those heads and layers, for example using gradient descent to update the variables in equations 10-15. As explained above, while the examples and discussion here often relates to a single block, or layer, of attention heads and MLP, the procedures described herein apply to all layers of the vision transformer. Moreover, while the attention-head ranking as described in, e.g., Algorithm 1 may use a subset batch B of images from the training set, the "soft" pruning procedure, e.g., as shown in Algorithm 2, may use the full set of training images.

While Algorithm 2 and the examples above describe specific examples of calculating and using importance scores s for determining the importance of (e.g., weights for) attention heads, for example determining s using the example methods of Algorithm 1, this disclosure contemplates that other approaches may be used in accordance with the embodiments disclosed herein. For example, the magnitude of weights in attention heads (e.g., the magnitude of the dense weights that are part of the trained vision transformer) may be used directly as the importance scores s to input to the optimized structured pruning (e.g., starting at step 3 in Algorithm 2), and the vision transformer may be pruned accordingly.

Figure 3:
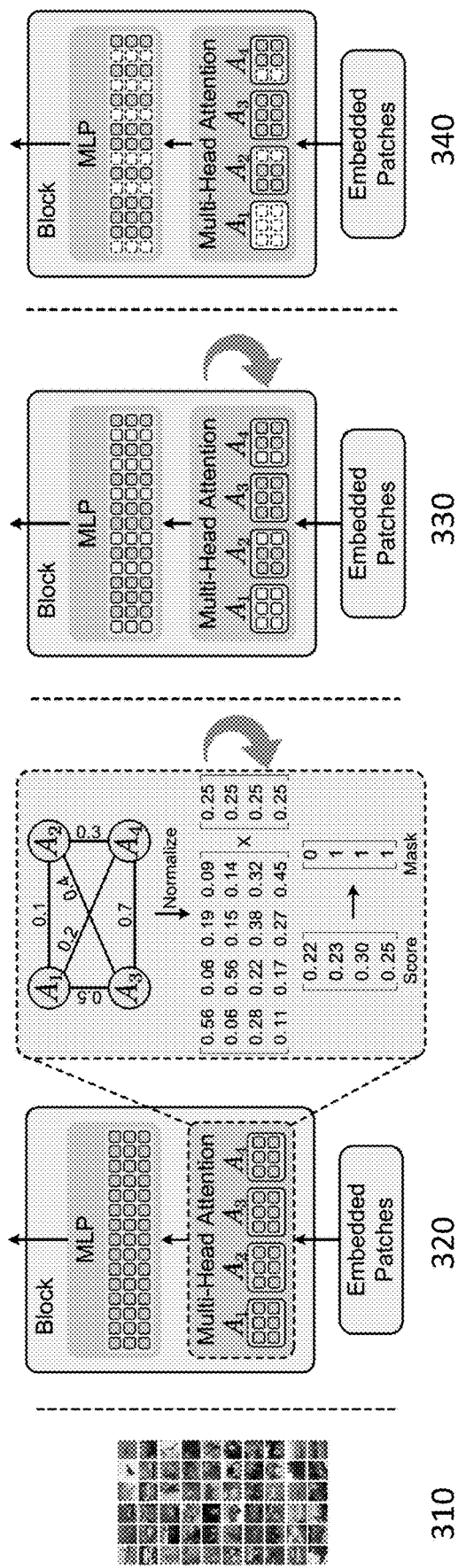
FIG. 3 illustrates an example procedure for structured pruning of a vision transformer.

FIG. 3 illustrates an example procedure for structured pruning of a vision transformer, which while simplified, illustrates many aspects of embodiments described herein. As shown in FIG. 3, a batch of images 310 are selected from a set of images that were used to fully train the vision transformer. This batch of images is used in flow 320 to determine importance scores for the attention heads in the vision transformer. FIG. 3 illustrates one layer, or block, of attention heads A1-A4 and one MLP layer, but as explained above, this disclosure contemplates that a vision transformer can (and typically does) include multiple layers of attention heads and MLPs, such as for example 12 such layers. Moreover, the number of attention heads and the number of columns in the attention heads and MLP layer are shown for illustration purposes only; the actual number of such heads and columns is typically much larger.

Each image from the batch is broken into patches and the embedded patches are input to the vision transformer. Each attention head $A_1$-$A_4$ outputs a vector, and the output vectors are typically concatenated into a feature vector for input to the MLP (and to other layers in the vision transformer). As shown in flow 320, the output of each attention head on each image in the batch is summed and compared to the summed output for each attention head, including itself, e.g., as described in equation 3. The cosine similarity values are shown as a graph in flow 320 with the attention heads as nodes and the edges illustrating the similarity values (although the self-similarity values are not shown). For example, the similarity value resulting from equation 3 for $A_1$, $A_4$ is 0.2, and the similarity value for $A_2$, $A_4$ is 0.3. As shown in flow 320, the similarity values are placed into a matrix (matrix P as described above) and the columns are normalized. The resulting matrix is multiplied by an initial score vector; in flow 320, the initial values are 0.25 for each attention head. The updated score vector is obtained by iteratively multiplying P by s, for example as explained above with respect to Algorithm 1, until a final score vector (shown as "Score" in flow 320) is obtained. A binary mask is then created, as illustrated in flow 320. The process shown within respect to flow 320 and described elsewhere herein may be performed for each attention-head layer in parallel or in sequence.

As described herein, particular embodiments may directly use the mask to prune attention heads from the vision transformer. However, as described herein and illustrated in FIG. 3, the mask may be used as part of a soft pruning procedure, e.g., as described with respect to Algorithm 2 and as shown in flow 330 of FIG. 3. While a batch of images were used to determine attention-head scores in flow 320, in particular embodiments flow 330 (and, in particular embodiments, Algorithm 2) use the entire training data set of images. Moreover, the soft pruning procedure is applied to all layers (e.g., all 12 attention-head layers and MLP layers) simultaneously, rather than being computed in a layer-by-layer fashion. As shown in FIG. 3 and described more fully herein, the result of the soft-pruning procedure arise a set of weights, with many weights being substantially reduced. For example, the attention head columns and MLP columns with low weights are illustrated in flow 330 by lighter shading, while darker shading indicates relatively more important (higher weighted) columns and heads. Pruning can then be performed, as shown in flow 340 and described more fully with respect to, e.g., Algorithm 2, by pruning the heads and columns as specified by the pruning goals for the vision transformer, e.g., a specified percentage reduction in model parameters. The weights corresponding to pruned columns and attention heads are set to zero. The re-weighted vision transformer is then trained one or more times using the training dataset of images. The final vision transformer can then be deployed on (e.g., downloaded by) a device, such as a mobile device, to perform vision-related tasks. In addition, any model for any task that uses an architecture of a vision transformer may be pruned using the procedures disclosed herein.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 4:
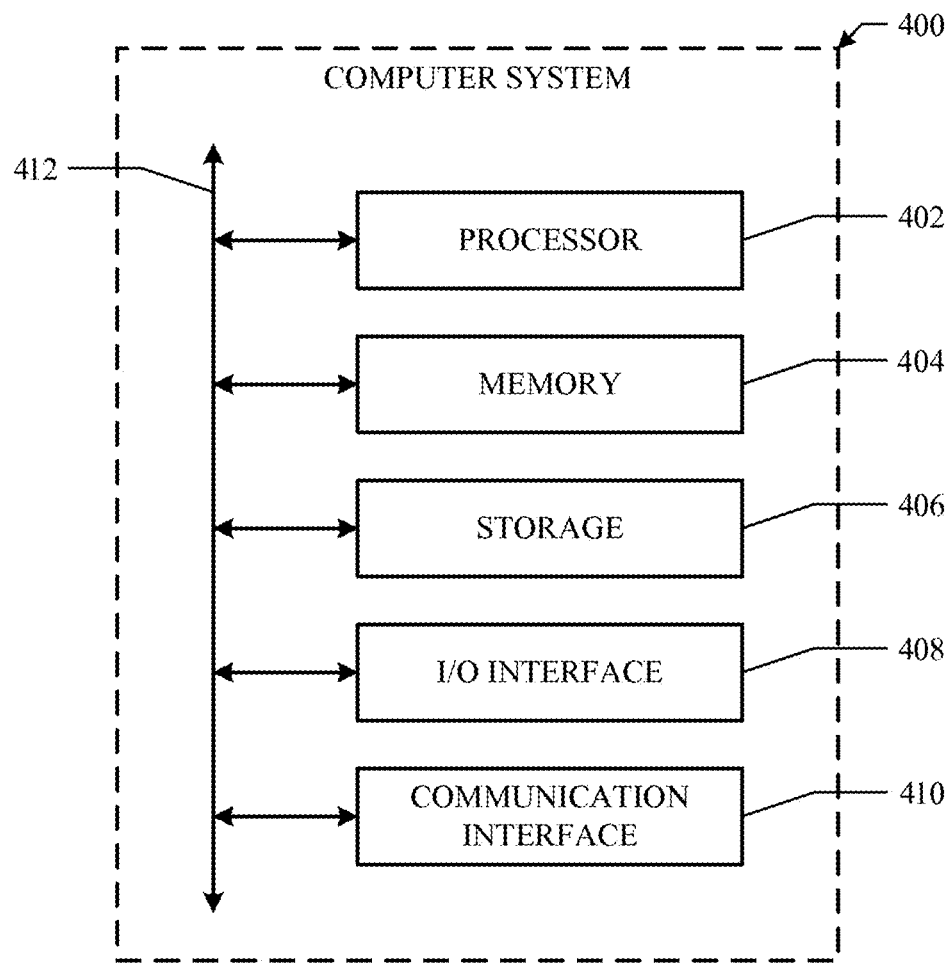
FIG. 4 illustrates an example computing device.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
accessing a batch B of a plurality of images, wherein each image in the batch is part of a training set of images used to train a vision transformer comprising a plurality of attention heads;
determining, for each attention head A of the vision transformer, a numerical similarity between (1) the collective output, of the attention head A, generated by inputting each of the images in the batch B to the vision transformer and the (2) collective output, of each attention head and on a per-attention-head basis, generated by inputting each of the images in the batch B to the vision transformer;
determining, based on the determined similarities, an importance score for each attention head, each importance score corresponding to its respective attention head's impact on performance of the vision transfer;
generating, based on the important scores of the attention heads, a binary attention mask matrix for the attention heads; and
creating a heterogeneous structured-sparse vision transformer by:
iteratively adjusting a set of attention-head specific weights and a set of MLP-specific weights for the transformer based on (1) the binary attention mask matrix for the attention heads and on (2) an identified reduction in parameters of the vision transformer; and
pruning, based on the iteratively adjusted set of attention-head specific weights and the set of MLP-specific weights, (1) one or more attention heads from the vision transformer (2) one or more attention-head columns within the attention heads and (3) one or more MLP columns from the vision transformer.

2. The method of claim 1, wherein determining the numerical similarity comprises determining a similarity matrix P, wherein each entry i,j in the similarity matrix P is equal to $\text{CosineSim}(\Sigma_{b=1}^{B} A_i(X_b), \Sigma_{b=1}^{B} A_j(X_b))$, and wherein $X_b$ comprises a vector representation of image b.

3. The method of claim 2, wherein each importance score corresponds to an entry in a vector s, and wherein s=Ps and s is initialized with a set of initial values.

4. The method of claim 3, wherein determining the importance score for each attention head comprises iteratively determining s until a difference in s between iterations is less than a predetermined threshold amount.

5. The method of claim 4, further comprising:
converting a final score vector s obtained after the last iteration to a binary mask; and
pruning the one or more attention heads based on the binary mask.

6. The method of claim 5, wherein pruning the one or more attention heads based on the binary mask comprises:
executing a GOHSP procedure using the binary mask as an input to the procedure; and
pruning the one or more attention heads based on attention-head weights obtained as an output of the GOHSP procedure.

7. The method of claim 6, wherein the vision transformer further comprises a plurality of MLPs, and the method further comprises pruning one or more columns in an MLP based on MLP-weights obtained as the output of the GOHSP procedure.

8. The method of claim 7, wherein the plurality of attention heads comprise twelve layers of attention heads and the plurality of MLPs comprise twelve layers of MLPs.

9. The method of claim 6, wherein pruning the one or more attention heads based on the output of a GOHSP procedure comprises pruning a predetermined number of parameters from the vision transformer model.

10. The method of claim 9, wherein the predetermined number comprises a predetermined percentage of model parameters of the vision transformer.

11. One or more non-transitory computer readable storage media embodying instructions and coupled to one or more processors that are operable to execute the instructions to:
access a batch B of a plurality of images, wherein each image in the batch is part of a training set of images used to train a vision transformer comprising a plurality of attention heads;
determine, for each attention head A of the vision transformer, a numerical similarity between (1) the collective output, of the attention head A, generated by inputting each of the images in the batch B to the vision transformer and the (2) collective output, of each attention head and on a per-attention-head basis, generated by inputting each of the images in the batch B to the vision transformer;
determine, based on the determined similarities, an importance score for each attention head, each importance score corresponding to its respective attention head's impact on performance of the vision transfer; and
generate, based on the important scores of the attention heads, a binary attention mask matrix for the attention heads; and
create a heterogeneous structured-sparse vision transformer by:
iteratively adjusting a set of attention-head specific weights and a set of MLP-specific weights for the transformer based on (1) the binary attention mask matrix for the attention heads and on (2) an identified reduction in parameters of the vision transformer; and
pruning, based on the iteratively adjusted set of attention-head specific weights and the set of MLP-specific weights, (1) one or more attention heads from the vision transformer (2) one or more attention-head columns within the attention heads and (3) one or more MLP columns from the vision transformer.

12. The media of claim 11, wherein determining the numerical similarity comprises determining a similarity matrix P, wherein each entry i,j in the similarity matrix P is equal to $\text{CosineSim}(\Sigma_{b=1}^{B} A_i(X_b), \Sigma_{b=1}^{B} A_j(X_b))$, and wherein $X_b$ comprises a vector representation of image b.

13. The media of claim 12, wherein each importance score corresponds to an entry in a vector s, and wherein s=Ps and s is initialized with a set of initial values.

14. The media of claim 13, wherein determining the importance score for each attention head comprises iteratively determining s until a difference in s between iterations is less than a predetermined threshold amount.

15. The media of claim 14, wherein the one or more processors are further operable to execute the instructions to:
convert a final score vector s obtained after the last iteration to a binary mask; and prune the one or more attention heads based on the binary mask.

16. A system comprising one or more processors and a non-transitory computer readable storage media embodying instructions coupled to the one or more processors, the one or more processors operable to execute the instructions to:
  access a batch B of a plurality of images, wherein each image in the batch is part of a training set of images used to train a vision transformer comprising a plurality of attention heads;
  determine, for each attention head A of the vision transformer, a numerical similarity between (1) the collective output, of the attention head A, generated by inputting each of the images in the batch B to the vision transformer and the (2) collective output, of each attention head and on a per-attention-head basis, generated by inputting each of the images in the batch B to the vision transformer;
  determine, based on the determined similarities, an importance score for each attention head, each importance score corresponding to its respective attention head's impact on performance of the vision transfer; and
  generate, based on the important scores of the attention heads, a binary attention mask matrix for the attention heads; and
  create a heterogeneous structured-sparse vision transformer by:
    iteratively adjusting a set of attention-head specific weights and a set of MLP-specific weights for the transformer based on (1) the binary attention mask matrix for the attention heads and on (2) an identified reduction in parameters of the vision transformer; and
    pruning, based on the iteratively adjusted set of attention-head specific weights and the set of MLP-specific weights, (1) one or more attention heads from the vision transformer (2) one or more attention-head columns within the attention heads and (3) one or more MLP columns from the vision transformer.

17. The system of claim 16, wherein determining the numerical similarity comprises determining a similarity matrix P, wherein each entry i,j in the similarity matrix P is equal to CosineSim($\Sigma_{b=1}^{B} A_i(X_b)$, $\Sigma_{b=1}^{B} A_j(X_b)$), and wherein $X_b$ comprises a vector representation of image b.

18. The system of claim 17, wherein each importance score corresponds to an entry in a vector s, and wherein s=Ps and s is initialized with a set of initial values.

19. The system of claim 18, wherein determining the importance score for each attention head comprises iteratively determining s until a difference in s between iterations is less than a predetermined threshold amount.

20. The system of claim 19, wherein the one or more processors are further operable to execute the instructions to:
  convert a final score vector s obtained after the last iteration to a binary mask; and
  prune the one or more attention heads based on the binary mask.

* * * * *